(12) United States Patent
Danowski

(10) Patent No.: US 7,239,233 B2
(45) Date of Patent: Jul. 3, 2007

(54) AFTER-MARKET, WATER-PROOF, VIBRATING MONITORING SYSTEM FOR MOTORCYCLE TURN INDICATORS

(76) Inventor: Jerome Joseph Danowski, 185 Tidewater Dr., Warwick, RI (US) 02889

( * ) Notice: Subject to any disclaimer, the term of this patent is extended or adjusted under 35 U.S.C. 154(b) by 110 days.

(21) Appl. No.: 10/932,640

(22) Filed: Sep. 1, 2004

(65) Prior Publication Data

US 2006/0044130 A1  Mar. 2, 2006

(51) Int. Cl.
  *B60Q 1/34* (2006.01)
  *G09B 21/00* (2006.01)
  *H04B 3/36* (2006.01)
(52) U.S. Cl. .............. 340/475; 340/407.1; 340/825.19; 200/61.27; 200/61.85; 434/112
(58) Field of Classification Search ................. 340/475
  See application file for complete search history.

(56) References Cited

U.S. PATENT DOCUMENTS

| | | | | |
|---|---|---|---|---|
| 4,361,829 A | * | 11/1982 | Kramholler et al. | ........ 340/475 |
| 5,348,370 A | | 9/1994 | Fukuoka | |
| 6,091,321 A | | 7/2000 | Karell | |
| 6,236,306 B1 | * | 5/2001 | Liebelt | ..................... 340/407.1 |
| 6,285,279 B1 | * | 9/2001 | Yamazaki | .................... 340/432 |
| 6,424,255 B1 | | 7/2002 | Shanahan | |

\* cited by examiner

*Primary Examiner*—Donnie L. Crosland

(57) ABSTRACT

A monitoring system in kit form to retrofit to motorcycles or other vehicles that do not have self canceling turn indicators and as an aid to the hearing impaired. After the kit is installed, when the indicators are activated, the device vibrates in the operator's seat alerting the operator that the indicators are in an active state. This also allows the operator to keep his eyes on the road. Once the indicators are inactivated, the device stops vibrating. The device also is coated protect the electric motor and cables from the elements.

2 Claims, 5 Drawing Sheets

AFTER-MARKET, WATER-PROOF, VIBRATING MONITORING SYSTEM FOR MOTORCYCLE TURN INDICATORS

FIELD OF THE INVENTION

This invention relates generally to indicators in vehicles, especially towards using an indicator which vibrates.

BACKGROUND OF THE INVENTION

The long felt need of this invention is also discussed in two other patents: Method and apparatus of a vibratory indicator for use in vehicles, U.S. Pat. No. 6,091,321 by Karell and Adjustable Delay Turn Signal Reminder Device for Mounting on a Motorcycle and the Like, US Patent application 20020105422 by Crabtree. The Karell patent like this invention, discusses a vibrating device in a seat along with sensing and logic devices to alert the operator that the signal is still activated. The Crabtree application discusses an adjustable delay mechanism to alert the operator. The invention in this application is much simpler in scope. This invention is for use in motorcycles that do not have self-canceling indicators; the vibrating device is directly wired into the indicator circuit. The only additional equipment may be a switch for disabling the device or a small relay or diode to insure proper operation in some vehicles, depending on their particular wiring and circuitry, The vibrating device has been designed to be weatherproof for operational reliability in inclement conditions. The main purpose of this design is to be sold as an after-market add-on safety device that is inexpensive and easy to install.

SUMMARY OF THE INVENTION

It is an object of this invention to provide an after-market kit that provides a tactual indicating system to warn motorcycle operators of the current status of the motorcycle's non-self-canceling turn indicators.

many motorcycles on the highway do not have self-canceling turn indicators, that is, the indicators continue to flash once activated by the motorcycle operator, until the operator remembers to deactivate the indicators. While there may be flashing monitors on the vehicle speedometer to warn the operator, this system requires the operator to take his/her eyes off the road. If the turn indicators remain on, the intentions of the vehicle operator become uncertain and can lead for an an unsafe condition. This system can be said to fill a long felt need in the motorcycle driving community as a retro-fit means of monitoring turn indicators.

The invention consists of a vibrating device that is placed in the operator's seat or backrest of the vehicle in question. The vibrating device is connected to the turn indicators by wires in an arrangement so that when the turn indicator is activated, the vibrating device is also activated and operates in an on/off fashion while the turn signals are active. This is a constant reminder to the operator that the directional signal is on and reminds the operator to cancel it when it is no longer needed. In the current design of this invention, the vibrating device consists of a 12-volt electric motor connected to an offset brass weight on its shaft. The assembly is inserted into a tubular housing by being pressed in, glued or heat-sealed in place. The ends are then capped and sealed with only the power wiring coming out of one end. Weatherproofing is achieved by dipping the assembly in a rubberized plastic coating or other suitable coating which seals the entire assembly. Other secondary end-caps may be placed over the ends for increased sealing and internal protection. The power wiring has a quick disconnect fitting so the seat or device can be easily removed during motorcycle maintenance and the final end of the power wiring is left stripped for ease of attachment to the vehicle's wiring harness. The addition of a diode or relay in the signal circuit is only needed on some applications. Its purpose is to negate the possibility of a voltage feed-through between the left and right directional circuits or to provide this assembly with the ability to operate in its own isolated circuit.

DESCRIPTION OF THE DRAWINGS

Figure One shows the vibrating device in detail.
Figure Two is the drawing of the invention and showing how to connect it to the vehicle.
Figure Three is the drawing of the invention and showing how to connect it with the brake light relay 10 added.
Figure Four is the drawing of the invention and showing how to connect it with isolation diodes 11 added.
Figure Five is the drawing of the invention and showing how to connect it with both relay 10 and diodes 11 added.

DISCLOSURE OF THE PREFERRED EMBODIMENT

Figure 1:
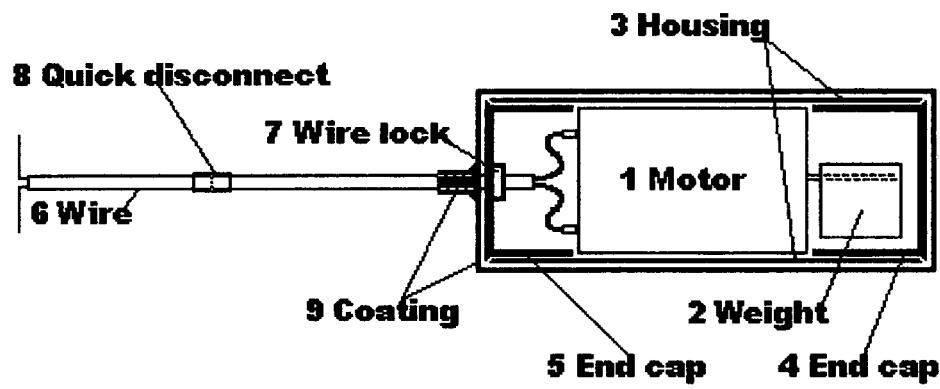
Figure 2:
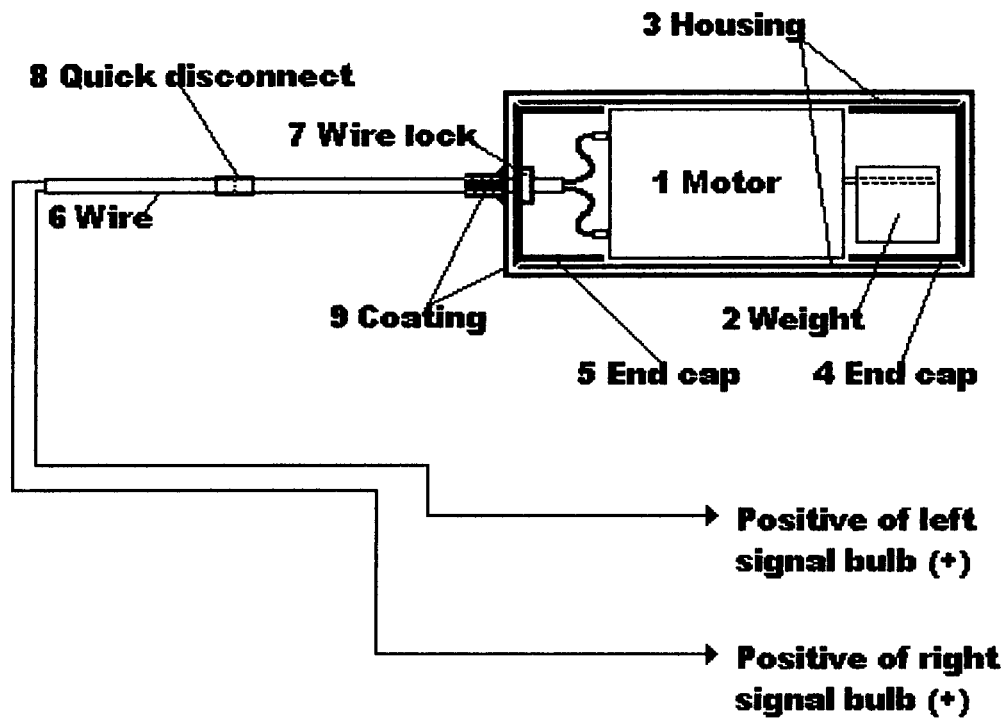

The 12 volt electric motor 1, is attached to an offset weight 2 to give a vibrating action when the motor is energized such as a current activated by a flashing turn indicator. The motor and weight are placed in a plastic housing 3, and sealed with a solid end cap 4 and an end cap with an aperture 5 so that the multi-conductor electric wire connectors 6 can exit the housing 3. These wires 6 are prevented from separating from the housing 3 and motor 1 by a wire lock 7. The multi-conductor electric wire may also have quick connectors 8, to allow for removal of the seat without removing the vibrating device. The whole assembly is dipped in a water-proof plastic/rubberized compound 9, to make the assembly water-tight.

Figure 3:
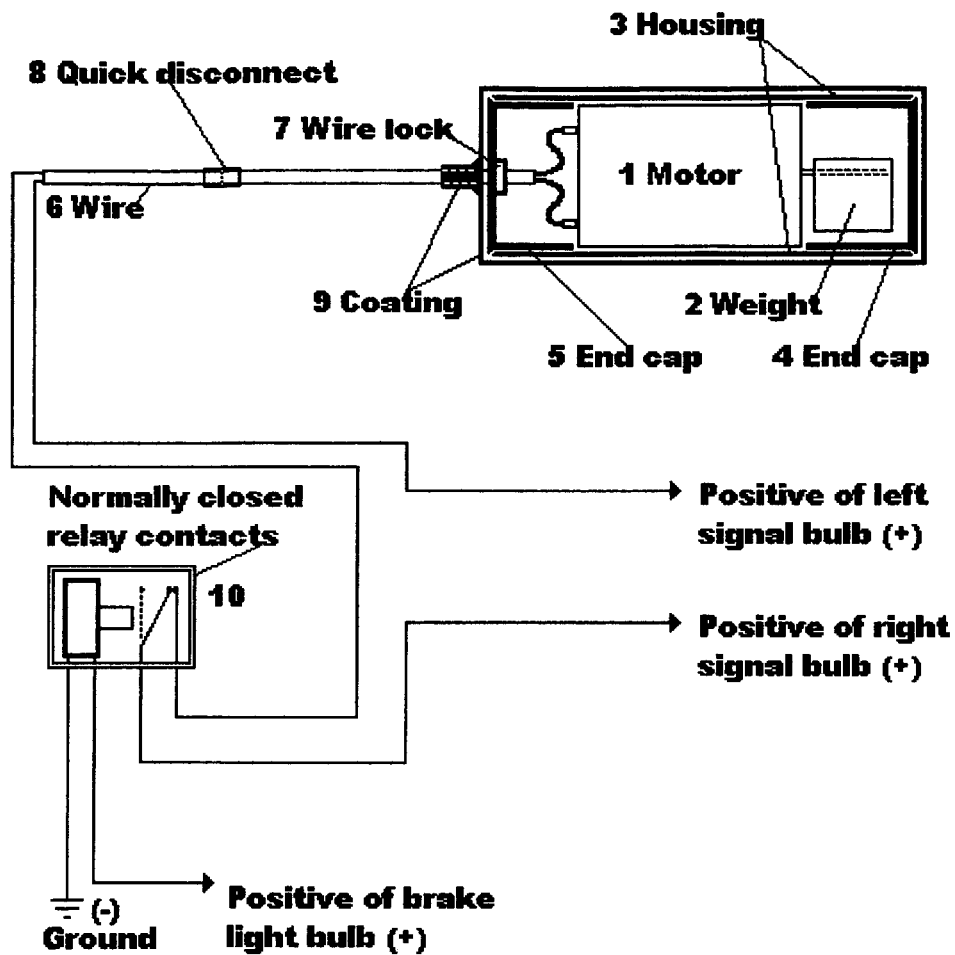

In FIG. 3, one of the wires 6, is connected to a relay which is then connected to a relay 10, so that the vibrating device is not activated when the brakes are applied.

Figure 4:
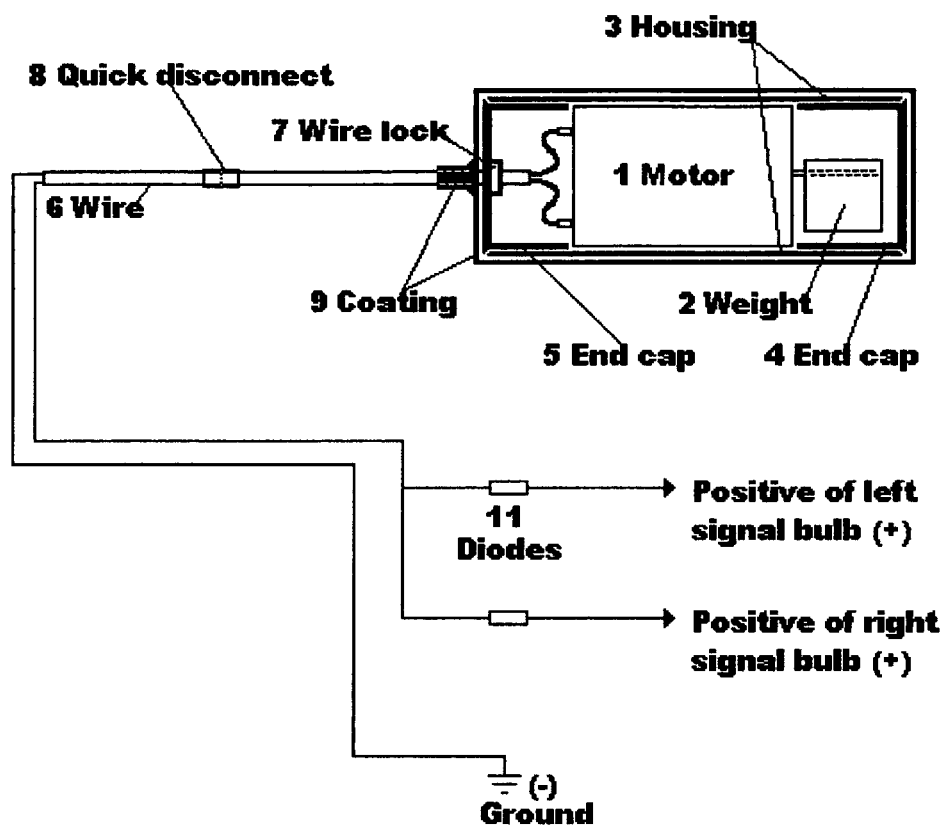
Figure 5:
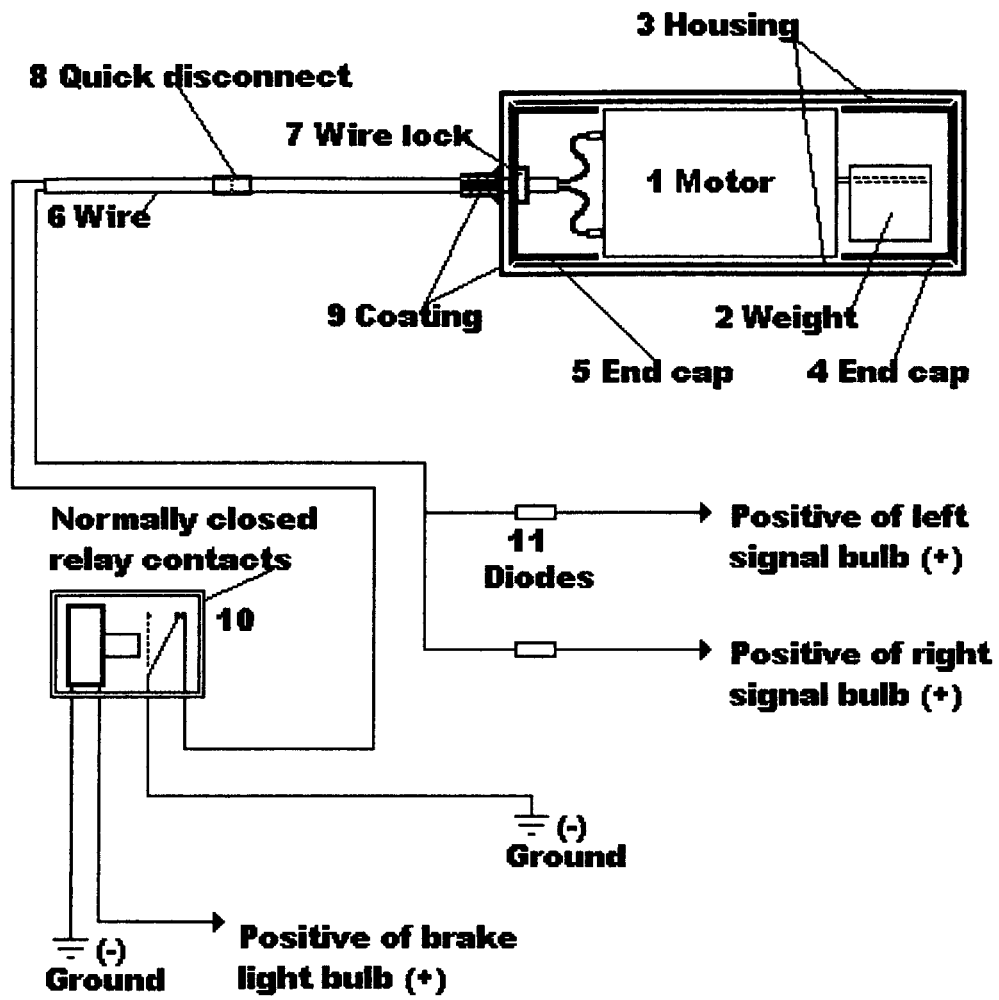

In FIG. 4 diodes, 11 and a relay 10 are added to the device to fully accommodate any pre-existing turn indicator device.

What is claimed is:

1. A monitoring system in kit forms, for use on motorcycles with non-canceling turn signal indicators and as an aid for the hearing impaired, consisting of:
   a. a vibrating portion constructed of a 12 volt electric motor affixed with an off-center weight on it's shaft and enclosed in a plastic or metal tube type housing;
   b. an end closure portion consisting of plastic or metal caps at each end of the housing, one of the caps has a small opening to allow an electric wire harness portion to pass through;
   c. said electric wire harness portion connected to said electric motor and a free end for direct connection to a turn indicator circuit;
   d. a male/female type quick-disconnect device placed in said electric harness portion to allow easy removal of the device from the turn indicator circuit of the motorcycles or vehicles;
   e. wherein an assembled and wired vibrating motor and end caps are dipped in weatherproof coating;

f. and wherein detailed instructions on how to affix the vibrating portion to an operator's seat of motorcycles or vehicles;
g. detailed instructions on how to connect the electric wire harness portion to wiring of the vehicle's turn signal indicator circuit;
h. an internet site to which information and support, receive orders and interact with the customer is provided.

2. A monitoring device in kit form as recited in claim 1, wherein said device includes a pair of diodes in circuit connection with said turn signal circuit for circuit isolation; and a relay and a brake circuit connection with said device whereby when said brake circuit is energized, said relay is triggered, thereby disabling the system.

\* \* \* \* \*